United States Patent Office 3,518,258
Patented June 30, 1970

3,518,258
PYRANO[3,2-i]QUINOLIZINE AND PROCESS FOR THE PRODUCTION
Max von Strandtmann, Rockaway, Marvin P. Cohen, New Milford, and John Shavel, Jr., Mendham, N.J., assignors to Warner-Lambert Pharmaceutical Company, Morris Plains, N.J., a corporation of Delaware
No Drawing. Filed May 9, 1967, Ser. No. 637,886
Int. Cl. C07d 33/38
U.S. Cl. 260—240                                         6 Claims

ABSTRACT OF THE DISCLOSURE

Substituted pyrano[3,2-i]quinolizines of Formula I

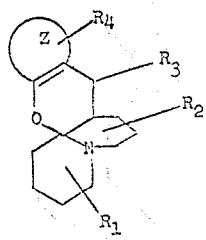

and the process for their preparation are disclosed. $R_1$, $R_2$, $R_3$, are hydrogen, lower alkyl, aralkyl, aryl, and $R_4$ is hydrogen, alkyl, aralkyl, alkylene, aralkylene, alkoxy, aryloxy, hydroxy, alkylamine, acylamine, halogen and Z represents an aromatic or heteroaromatic nucleus such as benzene, naphthalene, pyridine, quinoline, isoquinoline, and carbazole.

---

The present invention relates to substituted pyrano[3,2-i]quinolizines

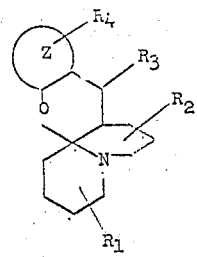

wherein $R_1$, $R_2$, $R_3$ are hydrogen, lower alkyl, aralkyl, aryl, $R_4$ is hydrogen, lower alkyl, aralkyl, lower alkylene, aralkylene, alkoxy, lower alkoxy, aryloxy, hydroxy, lower alkylamine, acylamine, halogen and Z represents an aromatic or heteroaromatic nucleus such as benzene, naphthalene, pyridine, quinoline, isoquinoline, and carbazole.

In the above definition for $R_1$, $R_2$, $R_3$, and $R_4$ lower alkyl and the lower alkyl portion of lower alkoxy, aralkyl and lower alkylamine is meant to include from 1 to 6 carbon atoms, such as methyl, ethyl, propyl, isopropyl, butyl, hexyl and the like. Lower alkylene is meant to include from 2 to 6 atoms, such as ethylene, propylene and the like. Acyl is the residue derived from carboxylic acid, such as acetic, benzoic, propionic acid, and the like. Aryl includes both aromatic and heteroaromatic ring systems, such as benzene, naphthalene, pyridine, quinoline, isoquinoline, carbazole, and the like.

The compounds of this invention are useful as central nervous system stimulating agents in mammals. They are useful in conditions associated with mild depressive states. The compounds of this invention produce a mild stimulant effect to restore the depressed mammal to a sense of well-being. A dose of about 50 to 100 milligrams several times daily is generally recommended. An outstanding advantage of the compounds of this invention resides in the fact that they produce the desired central nervous system stimulant effects without salivation and irritability side effects, which are commonly associated with other known central nervous system stimulants. In order to use the compounds of this invention, they are combined with an inert pharmaceutical carrier such as lactose, mannitol, dicalcium, phosphate, and the like and compounded in accordance with the pharmaceutical art to form dosage forms such as powders, tablets, capsules, and the like. They may also be combined with other inert pharmaceutical carriers such as water, syrup, and the like, to form dosage forms such as solution for injection and the like.

The compounds of this invention are prepared by allowing to react a dehydroquinolizidine of formula

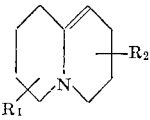

with a phenolic Mannich base of formula

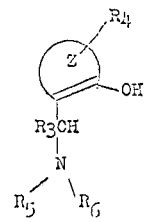

where $R_5$ and $R_6$ are lower alkyl or taken together with the nitrogen form a piperidine, pyrrolidine, piperazine or a morpholine ring. Examples of such phenolic Mannich bases are: 2-dimethylaminomethyl-α-naphthol, 1-dimethylaminomethyl-β-naphthol, 3-dimethylaminomethyl-β-naphthol, o-dimethylaminomethylphenol, α-dimethylamino-6-methoxy-o-cresol, 2-dimethylaminomethyl-3-hydroxypyridine, 5-dimethylaminomethyl-6-quinolinol etc.

The dehydroquinolizidines used as starting materials are prepared according to N. J. Leonard et al. J. Am. Chem. Soc., 77, 439 (1955).

The phenolic Mannich bases are prepared according to papers cited in "α-Aminoalkylierung" by H. Hellmann and G. Opitz, Verlag Chemie G. m. b. H. Weinheim, Germany, 1960.

The compounds of this invention also form acid addition salts with pharmaceutically acceptable acids, such as hydrochloric acid, hydrobromic acid, hydriodic acid, nitric acid, phosphoric acid, and sulfuric acid; and acetic acid, citric acid, tartaric acid, lactic acid, benzenesulfonic acid, toluene sulfonic acid, etc. These acid addition salts are also included within the scope of this invention.

In order to further illustrate the practice of this invention, the following examples are given. All temperatures are given in degrees centigrade.

EXAMPLE 1

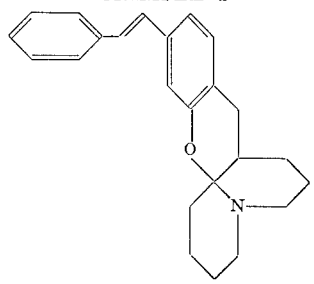

3

Trans-1,2,3,4,7,8,8a,9 - octahydro-11-styryl-6H-(1)benzopyrano[3,2-i]quinolizine: A suspension of 10 g. of $\Delta^{5(10)}$ dehydroquinolizidinium perchlorate in 40 ml. of $H_2O$ was made strongly basic with 40% NaOH solution and the mixture was extracted with four 50 ml. portions of ether. Combined ether extracts were dried over $Na_2SO_4$, and evaporated to an oily residue under reduced pressure. The residue was dissolved in 50 ml. of dioxane, 10.7 g. of 3-dimethylaminomethyl-4-stilbenol was added, and the mixture was refluxed under a stream of nitrogen for 48 hr. The solvent was removed under reduced pressure, and the residual gum was recrystallized from $CH_2CN$, M.P. 88–93°; yield 3 g. (29%); max. m$\mu$ (E) 233 (14,700), 310 (29,800), 321 (30,700); max. 680 (m.), 750 (m.), 860 (m.), 960 (m.), 1020 (m.w.), 1115 (m.s.), 1245 (s.), 1500 (m.s.), 1580 (m.w.), 1600 (m.w.) cm.$^{-1}$.

Analysis.—Calcd. for $C_{24}H_{27}NO$ (percent): C, 83.44; H, 7.88; N, 4.04. Found (percent): C, 83.69; H, 7.88; N, 4.15.

EXAMPLE 2

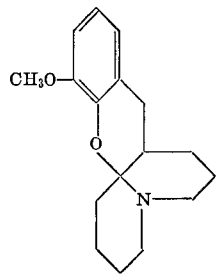

Prep. of 1,2,3,4,7,8,8a,9-octahydro-13-methoxy-6H(1)benzopyrano-[3,2-i]quinolizine: A suspension of 20 g. of $\Delta^{5(10)}$ dehydroquinolizidinium perchlorate in 80 ml. of $H_2O$ was made strongly basic with 40% NaOH. The mixture was extracted 4 times with 25 ml. portions of ether. The combined ether extracts were dried over $Na_2SO_4$, and concentrated to an oil under reduced pressure. The oil was dissolved in 100 ml. of dioxane, 15.2 g. of 2-dimethylamino-6-methoxy-o-cresol was added, and the mixture was refluxed under a stream of nitrogen for 48 hr. The solvent was removed, and the residual oil was recrystallized from $CH_3CN$, M.P. 95–95°; yield 11.5 g. (50%); max. m$\mu$ (E) 223 (shoulder) (8000), 273–83 (plateau) 2000; max. 720 (m.s.), 750 (m.s.), 870 (m.s.), 960 (m.), 1070 (m.s.), 1090 (m.s.), 1125 (m.s.), 1250 (s.), 1585 (m.), cm.$^{-1}$.

Analysis.—Calcd. for $C_{17}H_{23}NO_2$ (percent): C, 74.69; H, 8.48; N, 5.12. Found (percent): C, 74.71; H, 8.41; N, 4.97.

EXAMPLE 3

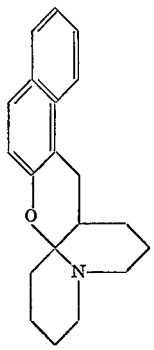

2,3,5,6,7,8,16,16a-octahydro - 1H - naptho(1',2':5,6)pyrano[3,2-i]quinolizine: A suspension of 5 g. of $\Delta^{5(10)}$ dehydroquinolizidinium perchlorate in 20 ml. of $H_2O$ was made strongly basic with 40% NaOH. The mixture was extracted with four 25 ml. portions of ether. The combined ether extracts were dried over sodium sulfate and evaporated in vacuo. The oily residue was dissolved in 25 ml. of dioxane containing 4 g. of 1-dimethylaminomethyl-2-naphthol. The solution was refluxed under a stream of nitrogen for 24 hr. The solvent was removed in vacuo and the residual gum recrystallized from Skelly B, M.P. 209–12°; yield: 1 g. (17%); max. m$\mu$ (E) 234 (38,300), 266 (2,080), 277 (2,360), 289 (1,600), 320 (1,000), 334 (1,160); max. 755 (m.s.), 810 (m.s.), 865 (s.), 945 (m.s.), 1040 (m.), 1085 (m.s.), 1125 (m.s.), 1235 (s.), 1595 (m.), 1615 (m). cm.$^{-1}$.

Analysis.—Calcd. for $C_{20}H_{23}NO$ (percent): C, 81.87; H, 7.90; N, 4.77. Found (percent): C, 82.07; H, 7.93; N, 4.77.

EXAMPLE 4

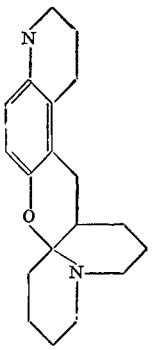

8,9,10,11,14,15,15a,16 - octahydro - 13H - quino(5',6':5,6)pyrano[3,2-i]quinolizine: This was prepared in identical fashion to 2,3,5,6,8,16,16a-octahydro-1H-naphtho(1',2':5,6)pyrano[3,2-i]quinolizine from 5 g. of $\Delta^{5(10)}$ dehydroquinolizidinium perchlorate and 4 g. of 5-dimethylaminomethyl-6-quinolinol. Product was recrystallized from abs. ethanol, M.P. 178–81°; yield: 3 g. (51%); max. m$\mu$ (E) 208 (26,000), 244 (44,600), 278 (2720), 287 (2760), 330 (3400); max. 740 (m.), 790 (m.s.), 855 (m.s.), 940 (m.s.), 1075 (m.s), 1125 (m.s.), 1225 (m.s.), 1501 (m.), 1590 (m.), 1610 (m.) cm.$^{-1}$.

Analysis.—Calcd. for $C_{19}H_{22}N_2O$ (percent): C, 77.52; H, 7.53; N, 9.52. Found (percent): C, 77.25; H, 7.65; N, 9.30.

EXAMPLE 5

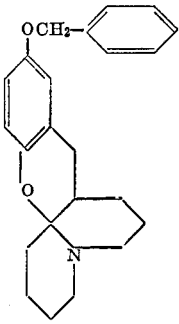

11-(benzyloxy)-1,2,3,4,7,8,8a,9 - octahydro-6H-(1)benzopyrano[3,2-i]quinolizine: This was prepared from 10 g. of $\Delta^{5(10)}$ dehydroquinolizidinium perchlorate and 10.8 g. of 4-benzyloxy-α-dimethylamino-o-cresol in analogous fashion to 1,2,3,4,7,8,8a-9-octahydro-11-styryl-6H-(1)benzopyrano[3,2-i]quinolizine. The material was recrystallized from abs. ethanol M.P. 66–67°; yield 4 g. (27%); max. m$\mu$ (E) 229 (11,000), 292 (3,600) max. 690 (m.), 750 (m.), 805 (m.), 885 (m.), 935 (m.), 1010 (m.s.), 1155 (m.), 1210 (m.s), 1230 (s.), 1490 (m.s.) cm.$^{-1}$.

*Analysis.*—Calcd. for $C_{23}H_{27}NO_2$ (percent): C, 79.05; H, 7.79; N, 4.01. Found (percent): C, 79.24; H, 8.07; N, 3.92.

It is understood that the foregoing detailed description is given merely by way of illustration and that many variations may be made therein without departing from the spirit of our invention.

Having described our invention, what we desire to secure by Letters Patent is:

1. A member selected from the group consisting of compounds of the formulas:

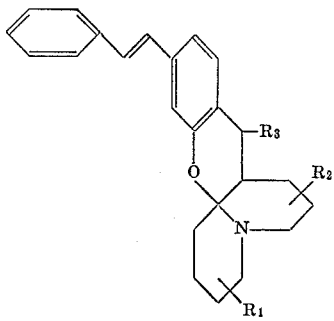

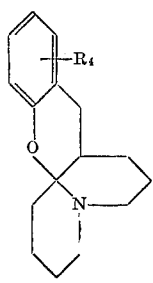

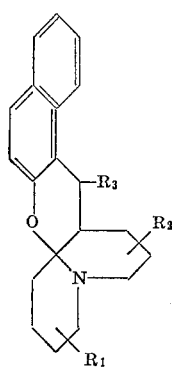

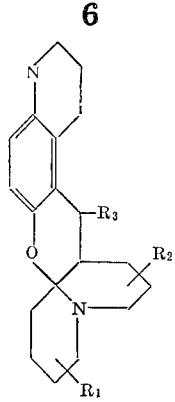

and

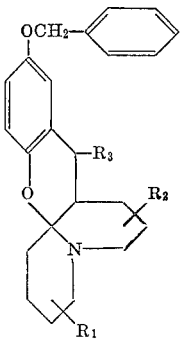

wherein $R_1$, $R_2$, $R_3$ are hydrogen, lower alkyl, phenyl lower alkyl, phenyl, and $R_4$ is hydrogen, lower alkyl, phenyl lower alkyl, lower alkylene, phenyl lower alkyene, lower alkoxy phenyloxy, hydroxy, lower alkylamine, acylamine in which acyl is that derived from a lower alkanoic or benzoic acid halogen, and its non-toxic pharmaceutically acceptable acid addition salts.

2. The compound of claim 1 which is: 1,2,3,4,7,8,8a,9-octahydro-13-methoxy - 6H(1)benzopyrano[3,2-i] quinolizine.

3. The compound of claim 1 which is: 2,3,5,6,7,8,16,16a-octahydro-1H-naptho(1',2';5,6)pyrano[3,2-i] quinolizine.

4. The compound of claim 1 which is: 8,9,10,11,14,15,15a,16 - octahydro - 13H - quino(5',6';5,6)pyrano[3,2-i] quinolizine.

5. The compound of claim 1 which is: 11-(benzyloxy)-1,2,3,4,7,8,8a,9-octahydro - 6H - (1)benzopyrano[3,2-i] quinolizine.

6. The compound of claim 1 which is: trans-1,2,3,4,7,8,8a,9-octahydro-11-styryl - 6H - (1)benzopyrano[3,2-i] quinolizine.

References Cited

Chemical Abstracts, vol. 62, col. 1639c (1965).

JOHN D. RANDOLPH, Primary Examiner

U.S. Cl. X.R.

260—289, 999